(12) United States Patent
Ito et al.

(10) Patent No.: US 6,584,158 B1
(45) Date of Patent: Jun. 24, 2003

(54) INFORMATION TRANSMISSION RECEPTION SYSTEM AND INFORMATION TRANSMISSION RECEPTION METHOD, AND INFORMATION RECEIVER USED THEREIN

(75) Inventors: Takeshi Ito, Tokyo (JP); Masaharu Yoshimori, Tokyo (JP); Eiji Kawai, Tokyo (JP)

(73) Assignee: Sony Computer Entertainment, Inc., Tokyo (JP)

( * ) Notice: Subject to any disclaimer, the term of this patent is extended or adjusted under 35 U.S.C. 154(b) by 0 days.

(21) Appl. No.: 09/362,802

(22) Filed: Jul. 28, 1999

(30) Foreign Application Priority Data

Jul. 28, 1998 (JP) .......................................... 10-213036

(51) Int. Cl.[7] .............................................. H04L 27/00
(52) U.S. Cl. ...................................................... 375/259
(58) Field of Search ................................ 375/219, 220, 375/222, 259, 295, 376, 221; 370/278, 282, 279, 395, 470–474; 455/403, 415, 426

(56) References Cited

U.S. PATENT DOCUMENTS

| | | | |
|---|---|---|---|
| 5,010,547 A | | 4/1991 | Johnson et al. |
| 5,159,331 A | | 10/1992 | Park et al. |
| 5,363,090 A | | 11/1994 | Cannon et al. |
| 5,374,925 A | | 12/1994 | Ohkuma |
| 5,881,055 A | * | 3/1999 | Kondo ........................ 370/311 |
| 5,974,458 A | * | 10/1999 | Abe et al. .................... 370/253 |
| 5,995,506 A | * | 11/1999 | Fujimori ...................... 370/389 |
| 6,101,215 A | * | 8/2000 | Takeda et al. ............... 375/221 |
| 6,125,275 A | * | 9/2000 | Comer et al. ................ 455/426 |
| 6,282,669 B1 | * | 8/2001 | Imanaka et al. ................ 714/4 |
| 6,335,920 B1 | * | 1/2002 | Strodtbeck et al. .......... 370/318 |

FOREIGN PATENT DOCUMENTS

EP  0 622 966  11/1994

* cited by examiner

Primary Examiner—Emmanuel P Bayard
(74) Attorney, Agent, or Firm—Katten Muchin Zavis Rosenman (57) ABSTRACT

An information transmission/reception system includes a radio paging data transmitter equipped with a data segmentation block which segments transmission data into transmission data segmentation units to obtain data segments, and an information identification number addition block which adds a plurality of pieces of identification information to each data segment in order to identify the transmission data. A sequence information addition block adds sequence information to each data segment in the sequence in which it is segmented, and a transmission processing block which performs transmission processing so that data segments to which different identification information is added are assigned within a single data transmission cycle. A radio paging data receiver of the information transmission/reception system is equipped with an information identification number discrimination block which performs the discrimination of data segments from the information identification number. The receiver further includes a data restoration block which restores the data segments for each identification information number stored in a memory based on the sequence information.

11 Claims, 8 Drawing Sheets

INFORMATION TRANSMISSION RECEPTION SYSTEM AND INFORMATION TRANSMISSION RECEPTION METHOD, AND INFORMATION RECEIVER USED THEREIN

BACKGROUND OF THE INVENTION

1. Field of the Invention

The present invention relates to an information transmission/reception system such as a wireless or radio paging system (referred as "radio paging system" hereinafter), and an information transmission/reception method, and an information transmitter and information receiver used therein.

2. Description of the Prior Art

Portable information receivers that are able to receive various types of information broadcast by means of radio paging and wireless broadcasting have been proposed. For example, such portable information receivers include the so-called pagers that are able to receive weather reports, various types of event information and other information distribution services.

Radio paging data transmission/reception systems that enable such radio paging transmit and receive an extremely wide variety of data. In addition, some of the types of data that are transmitted and received involve large volumes of data.

On the other hand, such radio paging data transmission/reception systems have a limitation in that data segments obtained by segmenting certain data are given the same identification number so they cannot be sent in the same transmission cycle.

SUMMARY OF THE INVENTION

An object of the present invention is to provide, in a radio paging system or other data transmission/reception system wherein large amounts of data are transmitted and received, a system that can easily identify and also transmit and receive data at high speed.

It is a further object of the present invention to provide an information transmission/reception method, along with an information transmitter and information receiver that can be used in such a system.

In order to obtain the above and other objects and solve the problems described above, the information transmission/reception system according to the present invention is configured such that the transmission means comprises: a transmission data segmentation means that segments transmission data into transmission data segmentation units to obtain data segments; an identification information addition means that adds a plurality of pieces of identification information to each data segment in order to identify the transmission data; a sequence information addition means that adds sequence information to each data segment in the sequence in which it is segmented; and a transmission processing means that performs transmission processing whereby data segments to which different identification information is added are assigned within a single data transmission cycle.

In addition, the reception means is configured such that the transmission data transmitted from the transmission means is restored based on the identification information and sequence information added to the data segments.

In an information transmission/reception system constituted as such, in the transmission means, the transmission data segmentation means segments transmission data into transmission data segmentation units to obtain data segments, the identification information addition means adds a plurality of pieces of identification information to each data segment in order to identify the transmission data, and the sequence information addition means adds sequence information to each data segment in the sequence in which it is segmented.

Moreover, in the transmission means, the transmission processing means performs transmission processing whereby data segments to which different identification information is added are assigned within a single data transmission cycle. In addition, in the reception means, the transmission data transmitted from the transmission means is restored based on the identification information and sequence information added to the data segments.

Thereby, the information transmission/reception system is able to perform the transmission/reception processing of a number of data segments formed by the segmentation of transmission data corresponding to the number of types of identification information in a single data transmission cycle.

In addition, in order to solve the problems described above, the information receiver according to the present invention receives the aforementioned transmitted transmission data generated when transmission data is segmented into transmission data segmentation units to obtain data segments to each of which is added sequence information in the sequence in which it is segmented and also to each of which is added a plurality of pieces of identification information in order to identify the transmission data, and the aforementioned data segments to which different identification information is added, are assigned within a single data transmission cycle. Moreover, the information receiver restores the transmission data transmitted from the transmission means based on the identification information and sequence information added to the data segments.

Thereby, the information receiver is able to receive data segments formed by the segmentation of transmission data corresponding to the number of types of identification information in a single data transmission cycle.

DETAILED DESCRIPTION OF THE PREFERRED EMBODIMENTS

A detailed explanation of an embodiment of the present invention with reference to the drawings is as follows: This embodiment is a radio paging data transmission/reception system wherein transmission data transmitted from a radio paging data transmitter is received by a radio paging data receiver. For example, the radio paging data transmission/reception system may consist of a broadcast-capable transmission/reception system.

Figure 1:
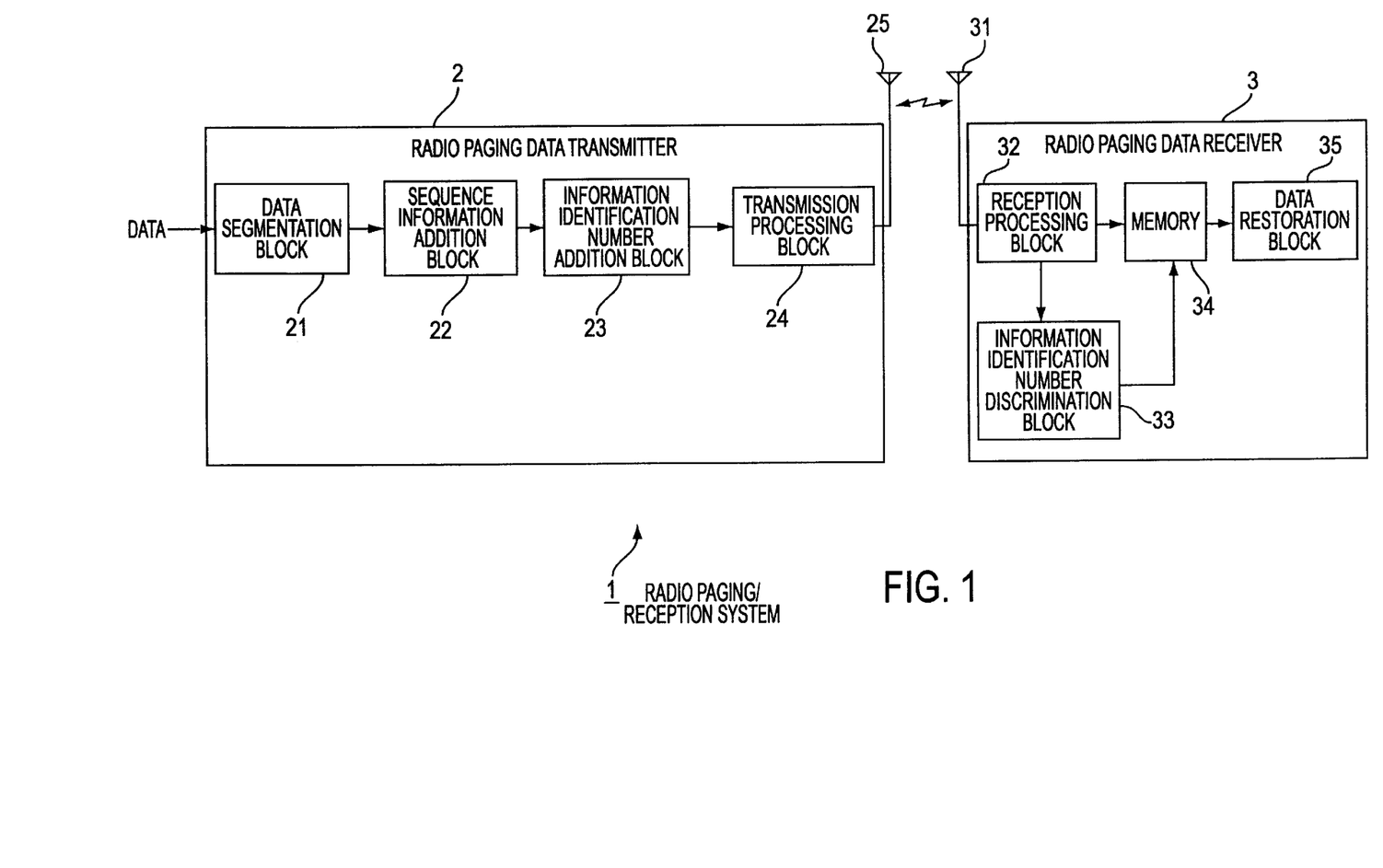
FIG. 1 is a block diagram showing the structure of a radio paging data transmission/reception system which is a mode of working the present invention.

As shown in FIG. 1, the radio paging data transmission/reception system includes a radio paging data transmitter 2 and a radio paging data receiver 3. For example, the radio paging data transmission/reception system 1 may be constructed as an information transmission/reception system whereby various types of information broadcast from a base station can be received by socalled pagers. The radio paging data transmitter 2 is equipped with a data segmentation block 21, a sequence information addition block 22, an information identification number addition block 23, a transmission processing block 24 and an antenna 25. The radio paging data transmitter 2 constitutes a base station for broadcasting radio paging data.

The radio paging data receiver 3 is equipped with an antenna 31, a reception processing block 32, an information identification number discrimination block 33, a memory 34 and a data restoration block 35. The radio paging data receiver 3 may constitute a compact, portable pager, for example.

In the radio paging data transmission/reception system 1, the radio paging data transmitter 2 has data segmentation block 21 which is a transmission data segmentation means that segments transmission data into transmission data segmentation units to obtain data segments; the information identification number addition block 23 which is an identification information addition means that adds a plurality of pieces of identification information to each data segment in order to identify the transmission data; sequence information addition block 22 which is a sequence information addition means that adds sequence information to each data segment in the sequence in which it is segmented; and transmission processing block 24 which is a transmission processing means that performs transmission processing whereby data segments to which different identification information is added are assigned within a single data transmission cycle.

In addition, radio paging data receiver 3 is an information receiver that restores the transmission data transmitted from the radio paging data transmitter 2 based on the identification information and sequence information added to the data segments.

Here follows an explanation of the various blocks or circuits that constitute the radio paging data transmitter 2 and radio paging data receiver 3.

First, the radio paging data transmitter 2 will be described in detail. In the radio paging data transmitter 2, the data segmentation block 21 performs the segmentation of input data. The segmentation of data is performed into transmission data segmentation units which are the transmittable units. It is to be noted that the segmentation of data by the radio paging data transmitter 2 is not always performed, but rather it is performed only when the amount of transmission data is large. The transmission data that is segmented by data segmentation block 21 is provided as an input to the sequence information addition block 22.

Figure 2:
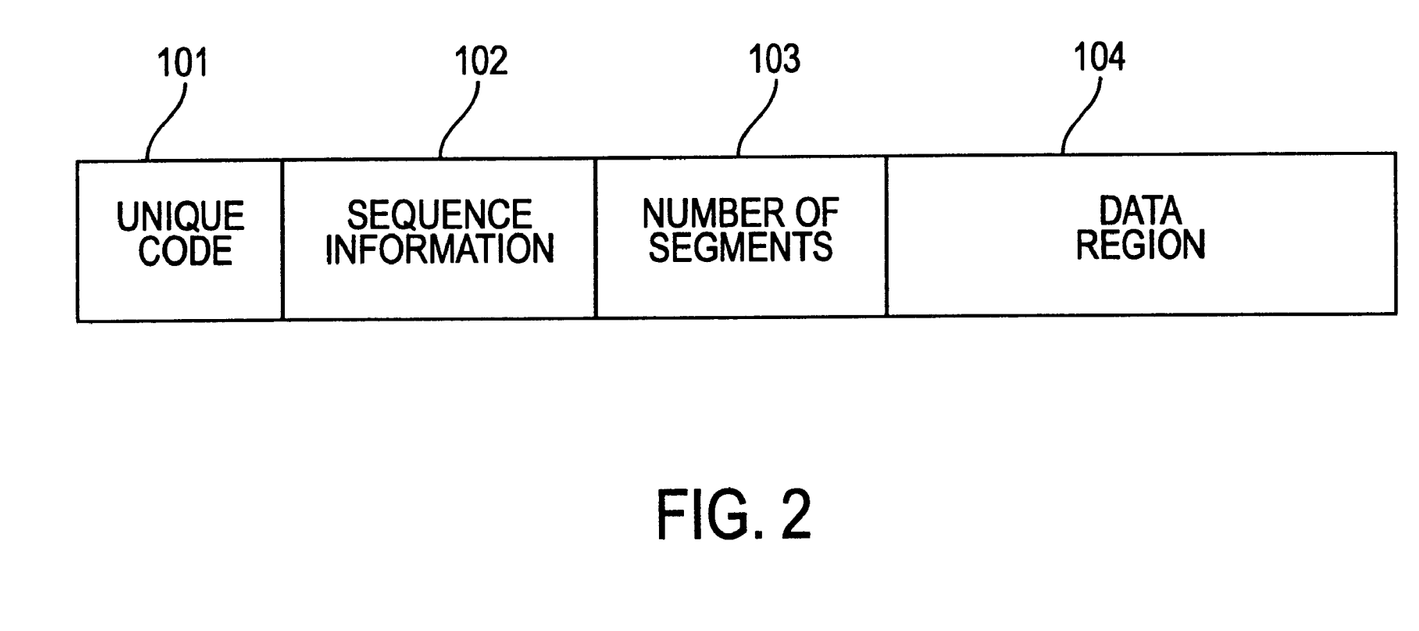
FIG. 2 is a diagram showing the packets of transmission data generated by a radio paging data transmitter equipped with the aforementioned radio paging data transmission/reception system.

The sequence information addition block 22 adds sequence information to the data segments. The sequence information addition block 22 adds sequential numbers starting from 0 (zero) as the aforementioned sequence information. As shown in FIG. 2, the addition of sequence information is performed by adding sequence information 102 to the data segments stored in data region 104. The data segments to which sequence information is added by the sequence information addition block 22 in this manner is provided as an input to the information identification number addition block 23.

The information identification number addition block 23 performs a process whereby an information identification number of a different type is added to each data segment.

Figures 3A, 3B:
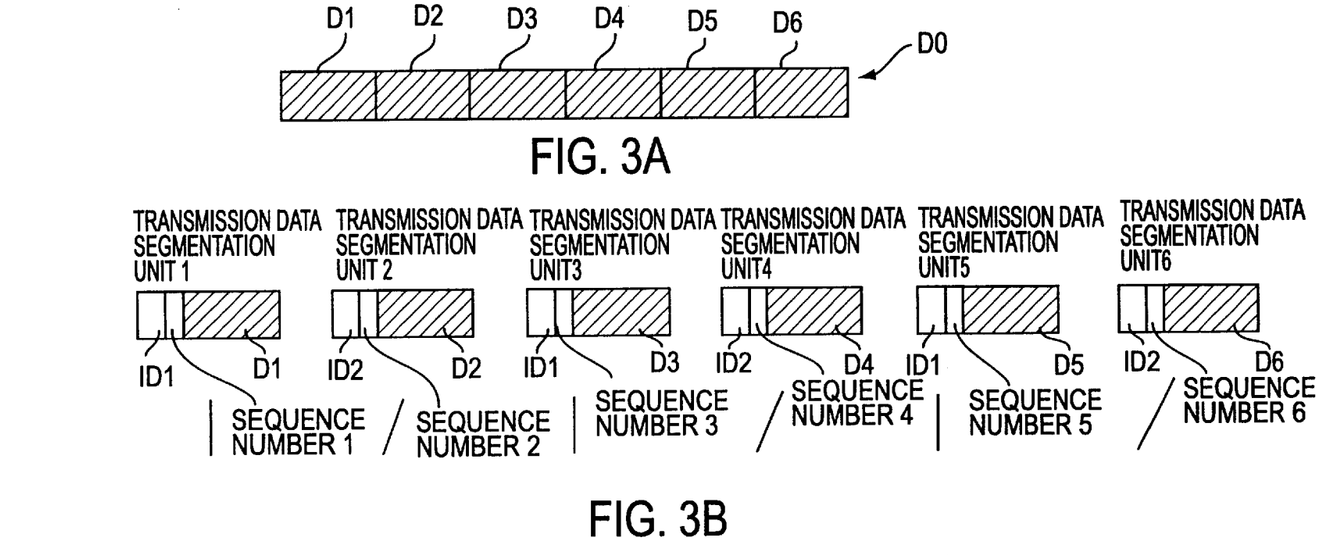
FIGS. 3A–3C are diagrams showing the procedure by which the radio paging data transmitter adds sequence information and information identification numbers to transmission data and transmits same.

The information identification number is information that indicates the type of data segment formed from the same transmission data. The information identification number consists of a plurality of information identification numbers by which it is possible to identify data segments that came from the same transmission data. For example, if it consists of two information identification numbers, as shown in FIG. 3B, "ID1" and "ID2" are assigned to the data segments. The addition of information identification numbers to data segments is performed concretely by adding a unique code 101 as shown in FIG. 2. The unique code 101 is a code used to identify whether the source of the data segments is identical or not, and need not be completely unique but rather it may be repeated.

The transmission information to which an information identification number is added by the information identification number addition block 23 is provided as an input to the aforementioned transmission processing block 24.

As shown in FIGS. 3A and B, the sequence information addition block 23 and transmission processing block 24 segment transmission data $D_0$ into data segments $D_1$–$D_6$, and add the sequence information consisting of sequence number "1," sequence number "2," . . . sequence number "5," sequence number "6" in sequence to data sequence $D_1$–$D_6$ segmented from transmission data $D_0$, and assign and add the information identification numbers consisting of "ID1" and "ID2" to the same.

Figure 3C:
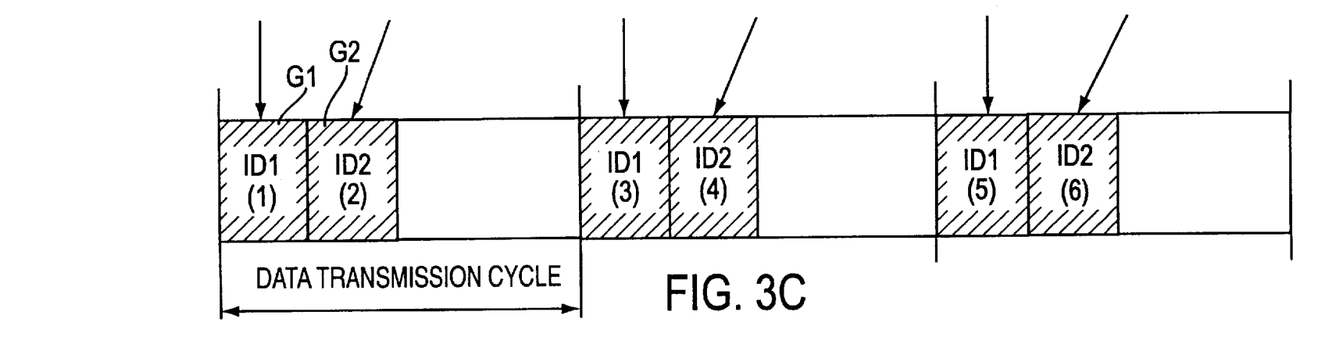

The transmission processing block 24 performs the transmission processing of the transmission data to which various information is added as described above. The transmission processing block 24 assigns data segments with different information identification numbers to each of the respective groups of a data transmission cycle which uses a plurality of groups as the transmission units. As shown in FIG. 3C, the data segments marked "ID1, sequence number 1" and "ID2, sequence number 2" are each stored in different groups in the same data transmission cycle and sent, while the data segments marked "ID1, sequence number 3" and "ID2, sequence number 4" are each stored in different groups in the next data transmission cycle and sent, and the data segments marked "ID1, sequence number 5" and "ID2, sequence number 6" are each stored in different groups in the next data transmission cycle and sent, and thus the transmission processing is performed in this way. The data subjected to transmission processing in transmission processing block 24 is transmitted from antenna 25.

The radio paging data transmitter 2 adds sequence information and information identification numbers to data segments according to the procedure shown in FIGS. 3A through C, and completes the transmission processing of the transmission data to the radio paging data receiver 3.

It is to be noted that the number of segments 103 can be added to the data segments as shown in FIG. 2. This number of segments 103 is a value that indicates the number of segments into which the transmission data is segmented, or namely information consisting of a number equal to 2 or greater. Upon receiving the number of data segments equal to this number of segments 103, the radio paging data receiver 3 assumes the reception of the transmission data in question is complete.

The radio paging data receiver 3 is equipped with an information identification number discrimination block 33 which is an identification information discrimination block that performs discrimination of data segments from the information identification number, a memory 34 which is a storage means that stores data segments marked with the same information identification number based on the results of the discrimination performed by the information identification number discrimination block 33, and a data restoration block 35 which is a restoration means that restores the data segments for each identification information number stored in memory 34 based on the sequence information.

In a radio paging data receiver 3 having such constituent blocks, the broadcast from the radio paging data transmitter 2 is received by the reception processing block 32 via the antenna 31. The data subjected to reception processing in this reception processing block 32 is subjected to discrimination of the information identification number added to the data segments in the information identification number discrimination block 33. To explain in terms of FIGS. 3A through C above, the information identification number discrimination block 33 discriminates between "ID1" and "ID2."

Based on the results of discrimination by the information identification number discrimination block 33, the memory 34 stores data segments provided as an input. For example, memory 34 may be divided into a number of regions corresponding to the number of types of information identification numbers.

Figure 4A:
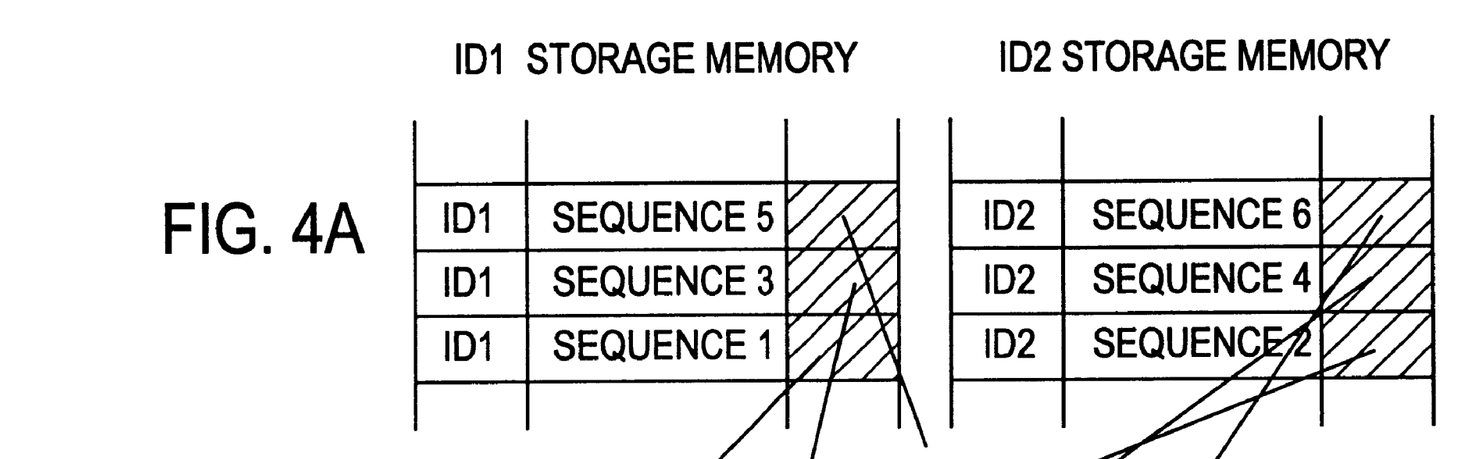
FIGS. 4A and 4B are diagrams showing the procedure by which a radio paging data receiver equipped with the aforementioned radio paging data transmission/reception system restores the transmission data transmitted from the radio paging data transmitter.

Thereby, as shown in FIG. 4A, depending on the results of discrimination, data is stored either in the ID1 storage memory region or the ID2 storage memory region. Here, the data with sequence number "1," sequence number "3" and sequence number "5" is stored sequentially in the ID1 storage memory region, while the data with sequence number "2," sequence number "4" and sequence number "6" is stored sequentially in the ID2 storage memory region.

Figure 4B:
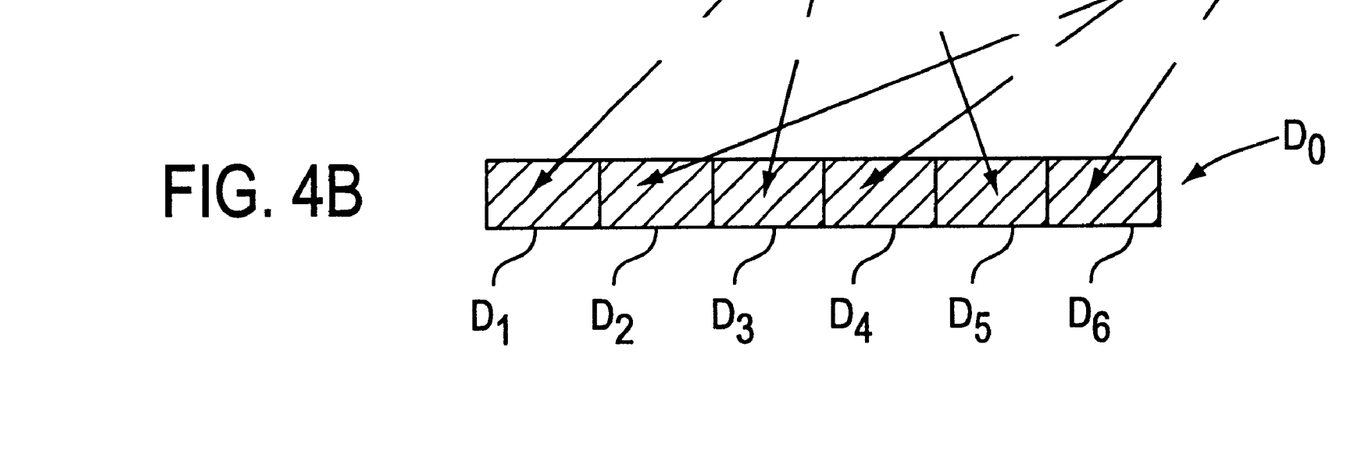

The data restoration block 35 extacts the data stored in the memory 34 as described above and restores the transmission data $D_0$ as shown in FIG. 4B based on the sequence information and sequence numbers added to each data segment.

Figure 5:
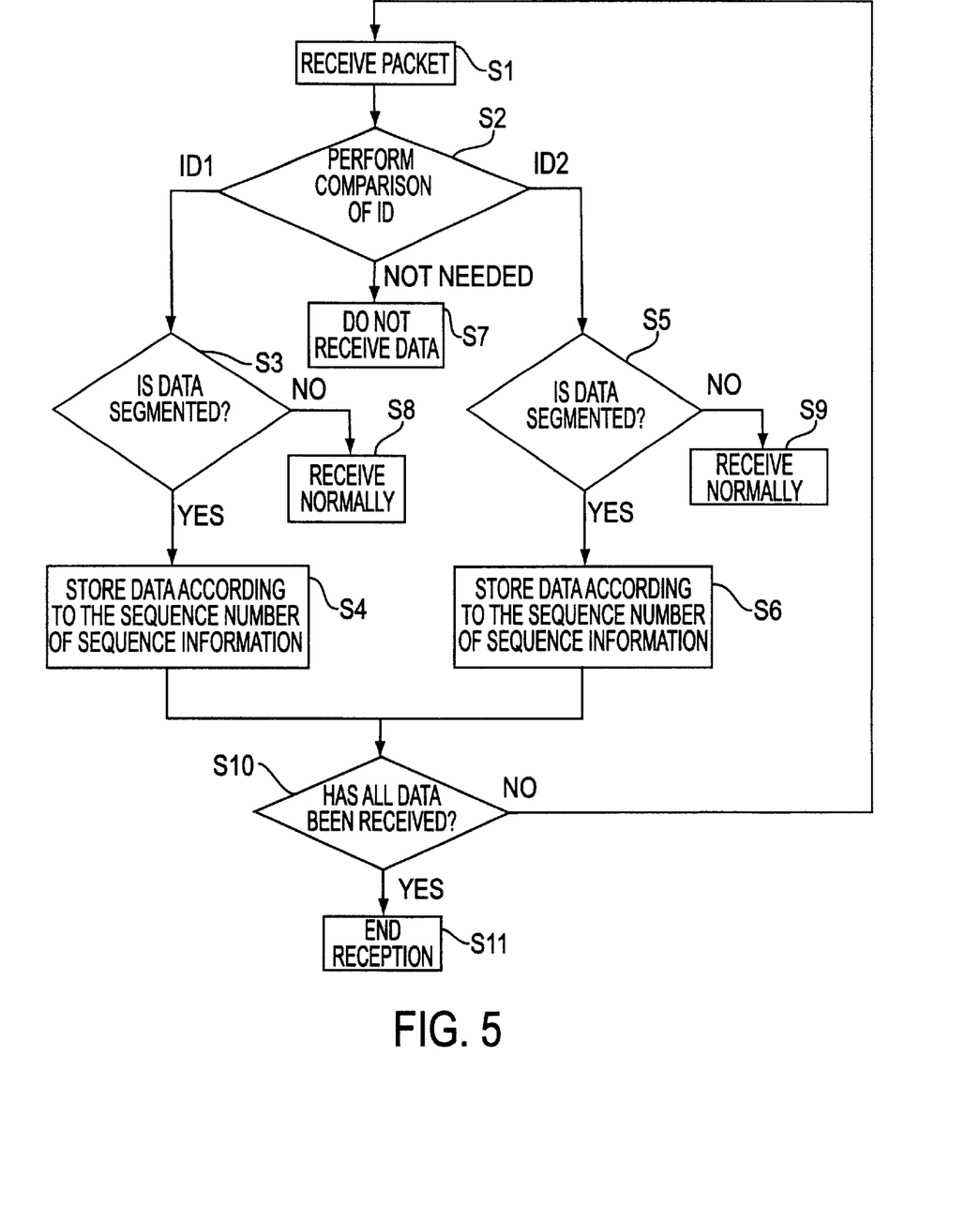
FIG. 5 is a flowchart showing a series of steps of reception processing performed on data that the radio paging data receiver has received.

FIG. 5 shows the series of steps in the reception processing performed by the radio paging data receiver 3. Here, one will assume that "ID1" and "ID2" are added to the data segments as information identification numbers.

As shown in this FIG. 5, in Step S1 the radio paging data receiver 3 receives a packet and in Step S2 performs a comparison of the information identification number ID. If the information identification number is determined to be ID1 as a result of its ID comparison, the radio paging data receiver 3 proceeds to Step S3, but if the information identification number is determined to be ID2, control proceeds to Step S5. On the other hand, if neither ID is found, the radio paging data receiver 3 does not perform the reception processing of the data in question.

In Step S3, the radio paging data receiver 3 determines whether the data is segmented or not. Segmentation may be determined by making reference to the number of segments 103 as shown in FIG. 2, for example.

If the received data is determined not to be segmented in Step S3, the radio paging data receiver 3 proceeds to Step S8 and performs the normal data reception processing. On the other hand, if the data is determined to be segmented, the radio paging data receiver 3 proceeds to Step S4.

In Step S4, the radio paging data receiver 3 performs the process of storing the data in memory 34 according to the sequence number of the sequence information added to the data. The radio paging data receiver 3 stores the data in question in the ID1 storage memory region.

The processing in Steps S3 and S4 described above is for the case that the information identification number is ID1, but the same processing is performed in the case that the information identification number is ID2.

If the information identification number is determined to be ID2 in Step S2, the radio paging data receiver 3 proceeds to Step S5 wherein it is determined whether or not the data is segmented. If the received data is determined not to be segmented in Step S5, the radio paging data receiver 3 proceeds to Step S9 and performs the normal data reception processing. On the other hand, if the data is determined to be segmented, the radio paging data receiver 3 proceeds to Step S6.

In Step S6, the radio paging data receiver 3 performs the process of storing the data in memory 34 according to the sequence number of the sequence information added to the data. The radio paging data receiver 3 stores the data in question in the ID2 storage memory region.

After the storage of data is performed in Steps S4 and S6, in Step S10 the radio paging data receiver 3 determines whether all data has been received or not. Here, if it is determined that all data has not been received, the radio paging data receiver 3 again performs packet reception in Step S1. If it is determined that all data has been received, the radio paging data receiver 3 proceeds to Step S11 and ends the reception processing.

The radio paging data transmission/reception system 1 is configured as described above and performs the transmission of data from the radio paging data transmitter 2 to the radio paging data receiver 3.

As described above, the radio paging data transmission/reception system 1 adds an information identification number and sequence information to the data segments obtained by segmenting transmission data. Thus, it is possible to transmit data segments obtained by segmenting transmission data stored in each of the groups that comprise a single data transmission cycle, and thus it is possible to send even a large volume of transmission data that exceeds the transmission units.

Moreover, as described above, the radio paging data transmission/reception system 1 performs the transmission processing of data using two information identification numbers, and thus it is possible to transmit two transmission data segment units in a single data transmission cycle. In other words, this radio paging data transmission/reception system 1 can perform the reception processing of a number of types of data segments obtained by segmenting transmission data equal to the aforementioned information identification number in a single data transmission cycle. Thereby, the radio paging data transmission/reception system 1 can shorten the transmission time so high-speed transmission is possible.

Figures 6A, 6B:
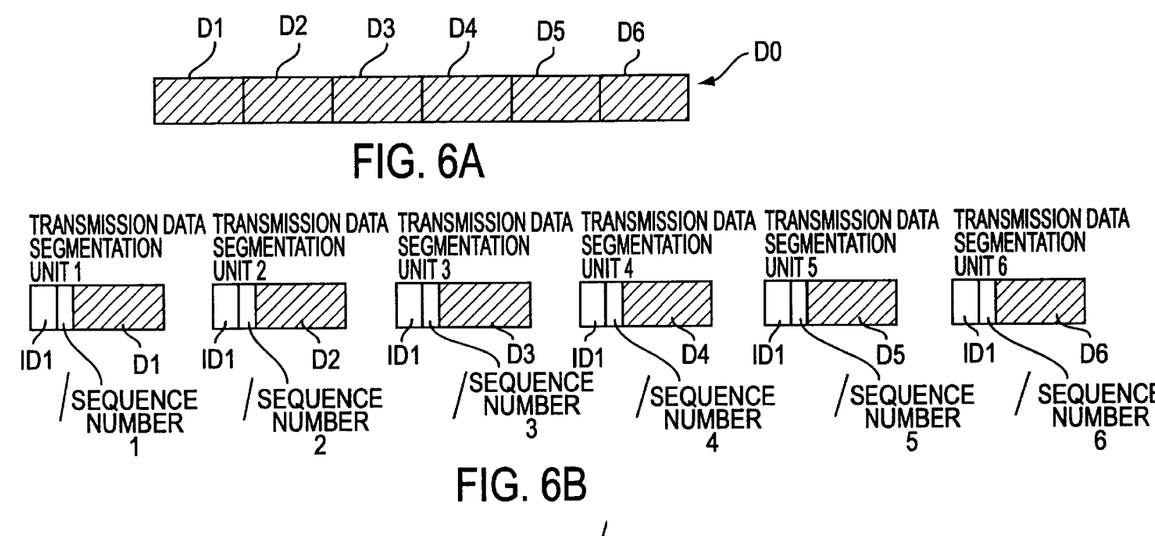
FIGS. 6A–6C are diagrams showing the procedure up until the transmission of data in the case in which the information identification number is unique.
Figure 6C:
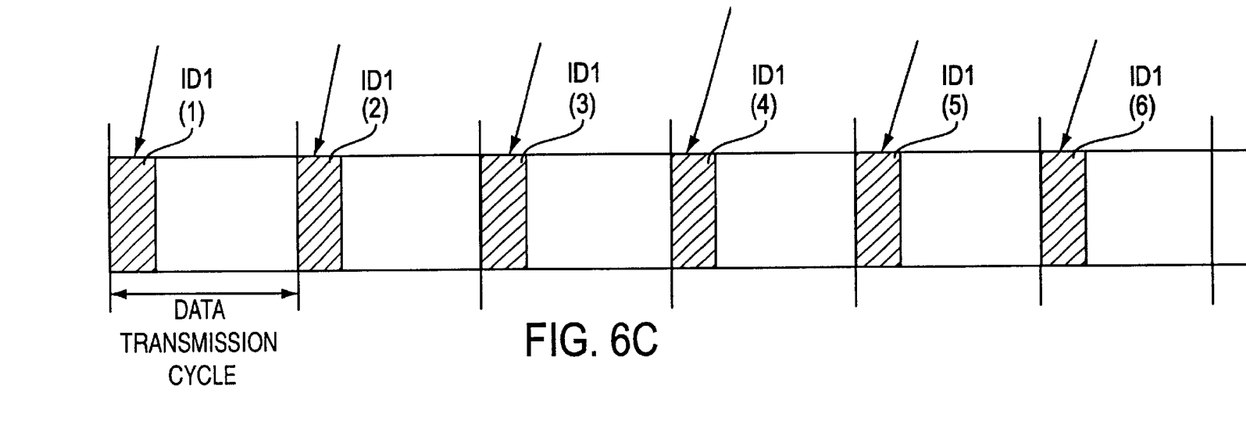

In the case in which the transmission data $D_0$ shown in FIG. 6A is segmented and only a unique information identification number (ID1) is added in all six transmission data segmentation units as shown in FIG. 6B, it is only possible to transmit a single transmission data segment unit in a single data transmission cycle, so the same number of data transmission cycles as the number of segment units is required. However, by using a plurality of information identification numbers as shown in FIG. 3C, it is possible to transmit two transmission data segment units in a single data transmission cycle. In this example, the transmission time is reduced by half.

In addition, with the radio paging data transmission/reception system 1, the received transmission data segment units are stored in separate memory regions for storing information corresponding to each information identification number, but sequence information is added over the transmission data segment unit, so after reception it is possible to reorder the transmission data segment unit correctly to restore the original transmission data. Thereby, the original transmission data can be restored even if segments are received out of order.

It is noted that in the description of the preferred embodiment, the original transmission data is restored by adding a number that indicates the sequence such as 1, 2, 3, . . . as the sequence information, but the sequence information is not limited to these numbers, as any mode of representation may be used as long as the radio paging data receiver 3 can restore the transmission data segment unit to the original transmission data.

In addition, in the embodiment described herein, the two information identification numbers of "ID1" and "ID2" are used to implement parallel data transmission, but this parallel data transmission can also be performed in the same manner using three or more information identification numbers. Thereby, the data transmission rate can be further increased, so it is possible to transmit data faster the more information identification numbers are used.

In addition, in this embodiment, the radio paging data receiver 3 stores data segments corresponding to each information identification number within a plurality of divided regions within a single memory 34 provided, but this is not a limitation. For example, it is possible to provide a plurality of memories each corresponding to one information identification number. Thereby, more data can be stored.

Figures 7A, 7B:
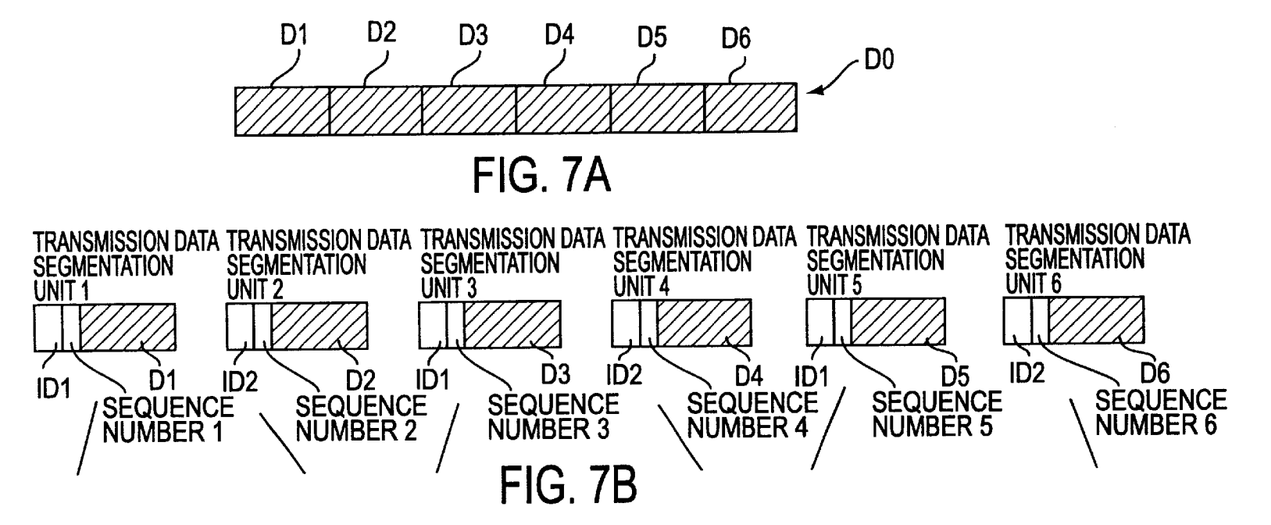
FIGS. 7A–7C, are diagrams showing a modified example of the procedure by which the aforementioned radio paging data transmitter adds sequence information and information identification numbers to transmission data up until transmission.
Figure 7C:
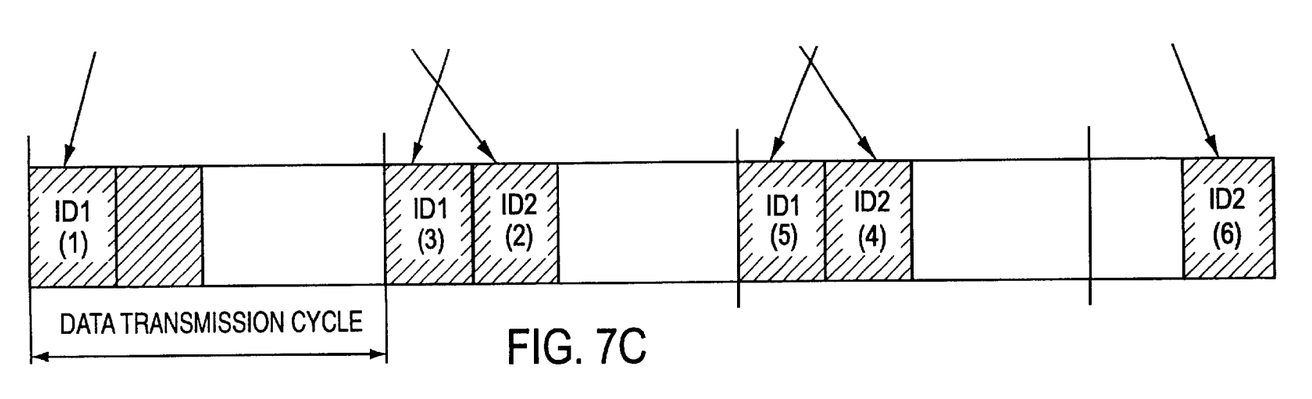

In addition, the transmission of data in the data transmission cycle is not limited to the transmission mode shown in the aforementioned FIG. 3C. For example, the transmission interval may not be constant or the sequence numbers according to sequence information may not be followed. An example of a case in which the sequence numbers according to sequence information are not followed is the transmission mode shown in FIG. 7C, where after the data segment marked "ID1, sequence number 1" is transmitted, in the next dam transmission cycle the data segments marked "ID1, sequence number 3" and "ID2, sequence number 2" are transmitted in the same data transmission cycle, and then next the data segments marked "ID1, sequence number 5" and "ID2, sequence number 4" are transmitted in the same data transmission cycle. Note that the segmentation of transmission data and addition of various information is the same as in the aforementioned FIGS. 3A and B, namely the transmission data shown in FIG. 7A is segmented as shown in FIG. 7B and the sequence information (sequence number) is added and the information identification number (ID) is added. In this manner, even if the sequence numbers according to sequence information are not followed as shown in FIG. 7C, the radio paging data receiver 3 can restore the data as shown in FIGS. 4A and B.

Figure 8A:
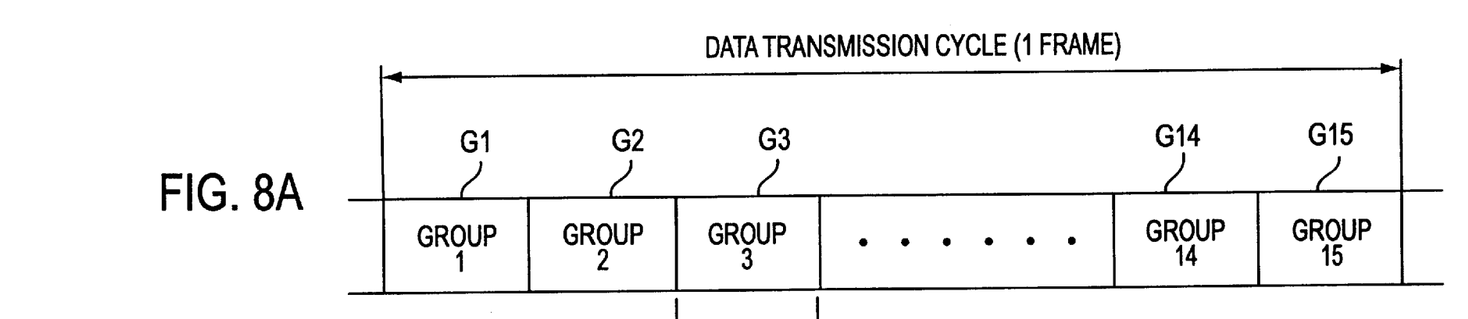
FIGS. 8A–8C are diagrams showing the structure of a signal transmitted in the radio paging data transmission/reception system constructed by means of a pager.
Figures 8B, 8C:
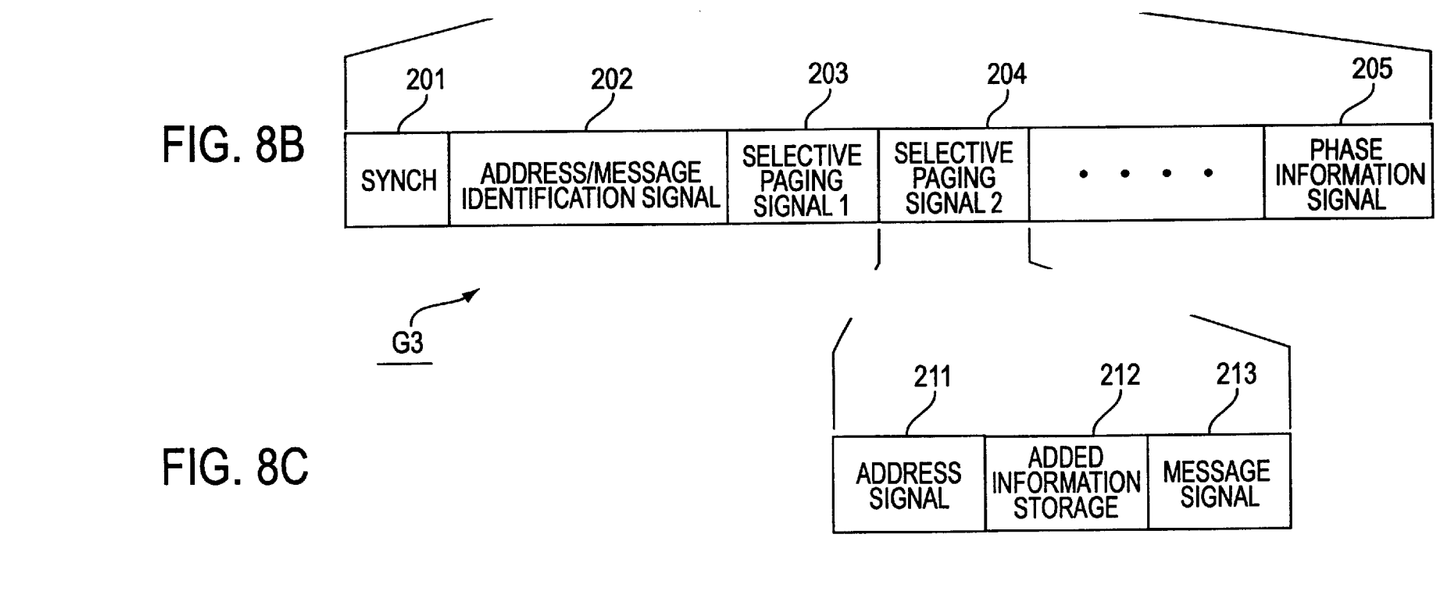

In addition, the signal scheme of a radio paging data transmission/reception system applied to a pager or the like is concretely composed as shown in FIGS. 8A through C.

As shown in FIG. 8A, the data transmission cycle composed of one frame consists of 15 groups $G_1$, $G_2$, $G_3$, . . . , $G_{14}$, $G_{15}$ as the data transmission units. The length of the data transmission cycle may be approximately 29 seconds, for example.

As shown in FIG. 8B, each of the groups consists of a synch signal 201, an address/message identification signal 202, selective paging signals 203 and 204, and a phase information signal 205. The address/message identification signal 202 referred to here may indicate the order within the selective paging signals in symbol units, for example.

As shown in FIG. 8C, the selective paging signal consists of an address signal 211, an added information storage block 212 and a message signal 213. Here, the message signal 213 consists of the aforementioned data segments, and the added information storage block 212 contains the aforementioned sequence information and information identification number.

Note that it need not be said that the present invention is not limited to being applied to the signal mode composed as shown in this FIG. 8. For example, in a data transmission scheme having a data storage region consisting of a plurality of constituents in the same manner as the groups described above, different information identification numbers may be added as described above to data segments which are stored in a plurality of such data storage regions and transmitted. Moreover, it can also be adapted to next-generation signal modes.

With a signal composed as such, the radio paging data receiver 3 belongs to one of the groups within the aforementioned frame and is synchronized by receiving the synch signal of the group to which it belongs, and then receives its own selective paging signal within that group. Moreover, a radio paging data receiver 3 that has received its own selective paging signal within a group will restore the transmission data as described above based on the sequence information and information identification number stored within the added information storage block 212.

In addition, the radio paging data receiver 3 is not limited to application as a pager. For example, the radio paging data receiver 3 may also be applied to a portable information communications terminal or a so-called Personal Digital Assistant (PDA) which maintains its portability while permitting the communication, organization and storage of information and the like.

In the information transmission/reception system according to the present invention, in the transmission means, the transmission data segmentation means can segment transmission data into transmission data segmentation units to obtain data segments, the identification information addition means can add a plurality of pieces of identification information to each data segment in order to identify the transmission data, and the sequence information addition means can add sequence information to each data segment in the sequence in which it is segmented. Moreover, in the transmission means, the transmission processing means can perform transmission processing whereby data segments to which different identification information is added are assigned within a single data transmission cycle. In addition, in the reception means, the transmission data transmitted from the transmission means can be restored based on the identification information and sequence information added to the data segments.

The information transmission/reception system is able to perform the transmission/reception processing of a number of data segments formed by the segmentation of transmission data corresponding to the number of types of identification information in a single data transmission cycle.

Thereby, data can be transmitted at high speed. In addition, sequence information for the data is added to data segments, so the reception means is able to restore the original transmission data even in the case in which the aforementioned data segments are received out of order.

In addition, in the information transmission/reception method according to the present invention, the transmission means segments transmission data into transmission data segmentation units to obtain data segments, adds sequence information to each data segment in the sequence in which it is segmented and also adds a plurality of pieces of identification information to each data segment in order to identify the transmission data, and assigns and transmits data segments to which different identification information is added within a single data transmission cycle. The reception means can restore the transmission data transmitted from the transmission means based on the identification information and sequence information added to the data segments. Thus, it is possible to perform the transmission/reception processing of a number of data segments formed by the segmentation of transmission data corresponding to the number of types of identification information in a single data transmission cycle.

Thereby, data can be transmitted at high speed. In addition, sequence information for the data is added to data segments, so the reception means is able to restore the original transmission data even in the case in which the aforementioned data segments are received out of order.

In addition, the information receiver according to the present invention receives the aforementioned data segments transmitted to it when transmission data is segmented into transmission data segmentation units to obtain data segments, sequence information is added to each data segment in the sequence in which it is segmented and also a plurality of pieces of identification information are added to each data segment in order to identify the transmission data, and the data segments to which different identification information is added are assigned within a single data transmission cycle. By restoring the transmission data transmitted from the transmission means based on the identification information and sequence information added to the data segments, it is possible to receive a number of data segments formed by the segmentation of transmission data corresponding to the number of types of identification information in a single data transmission cycle.

Thereby, data can be transmitted at high speed. In addition, sequence information for the data is added to data segments, so the reception means is able to restore the original transmission data even in the case in which the aforementioned data segments are received out of order.

By means of the present invention, by adding information identification numbers and sequence information to transmitted data segments, the order of data segments within the original data can be confirmed to be the same as that in the original data. Thereby, the original data can be easily recreated from the data segments.

In addition, even in the case in which specific data is segmented, by adding different types of information identification numbers to these data segments, they can be transmitted in the same transmission cycle, so high-speed transmission can be achieved.

What is claimed is:

1. An information transmission/reception system comprising:
   transmission means for transmitting data; and
   reception means for receiving said data from said transmission means;
   said transmission means comprising:
      a transmission data segmentation means that segments transmission data into transmission data segmentation units to obtain data segments;
      an identification information addition means that adds a plurality of pieces of identification information to each of said data segments in order to identify said transmission data;
      sequence information addition means that adds sequence information to each data segment in the sequence in which the transmission data is segmented into the data segments; and
      a transmission processing means that performs transmission processing whereby said data segments to which different identification information is added are assigned within a single data transmission cycle; and
   said reception means restoring said transmission data transmitted from said transmission means based on said identification information and said sequence information added to said data segments.

2. The information transmission/reception system recited in claim 1, wherein said reception means comprises:
   an identification information discrimination block that performs the discrimination of said data segments from said identification information;
   a storage means that stores said data segments marked with same identification information as a result of the discrimination performed by said identification information discrimination block; and
   a restoration means that restores the data segments for each of said identification information stored in said storage means based on said sequeuce information.

3. The information transmission/reception system recited in claim 1, wherein said transmission processing means assigns said data segments to which said different identification information is added to each group of said data transmission cycle in which a plurality of groups are the transmission units.

4. The information transmission/reception system recited in claim 1, wherein said reception means is constituted as a portable information communications terminal.

5. An information transmission/reception method wherein transmission data transmitted by a transmission means is received by a reception means, the information transmission/reception method comprising the steps of:
   taking by said transmission means data segments obtained by segmenting transmission data into transmission data segmentation units and adding sequence information to each data segment in the sequence in which the transmission data is segmented into the data segments and also adding a plurality of pieces of different identification information to each of said data segments in order to identify said transmission data, and assigning and transmitting said data segments to which said different identification information is added within a single data transmission cycle, and restoring by said reception means said transmission data transmitted from said transmission means based on said identification information and said sequence information added to said data segments.

6. An information transmitter used in an information transmission/reception system, comprising:

a transmission data segmentation means that segments transmission data into transmission data segmentation units;

an identification information addition means that adds identification information to each data segment;

a sequence information addition means that adds sequence information to each data segment; and a transmission processing means that performs transmission processing whereby a plurality of data segments are assigned within a single data transmission cycle; and wherein the identity of said transmission data can be identified by means of said identification information and the sequence of segmentation within the transmission data can be determined from said sequence information.

7. The information transmitter recited in claim 6, wherein said identification information addition means a different types of identification information to a plurality of data segments obtained by segmenting the transmission data, and enables to transmit said data segments within the transmission cycle.

8. An information receiver that receives transmission data formed in transmission means by taking data segments obtained by segmenting transmission data into transmission data segmentation units and adding sequence information to each data segment in the sequence in which the transmission data is segmented into the data segments and also adding a plurality of pieces of different identification information to each of said data segments in order to identify said transmission data, and assigning and transmitting said data segments to which said different identification information is added within a single data transmission cycle, wherein the information receiver restores said transmission data transmitted from said transmission means based on said identification information and said sequence information added to said data segments.

9. The information receiver recited in claim 8, comprising:

an identification information discrimination block that performs discrimination of said data segments from said identification information;

a storage means that stores said data segments marked with same identification information as a result of the discrimination performed by said identification information discrimination block; and a restoration means that restores the data segments for each of said identification information stored in said storage means based on said sequence information.

10. The information receiver recited in claim 8, wherein said data segments to which said different identification information is added are assigned to each group of said data transmission cycle in which a plurality of groups are transmission units.

11. The information receiver recited in claim 8, which is configured as a portable information communications terminal.

* * * * *